E. F. WADHAMS.
Fire-Extinguisher.
No. 162,721.  Patented April 27, 1875.
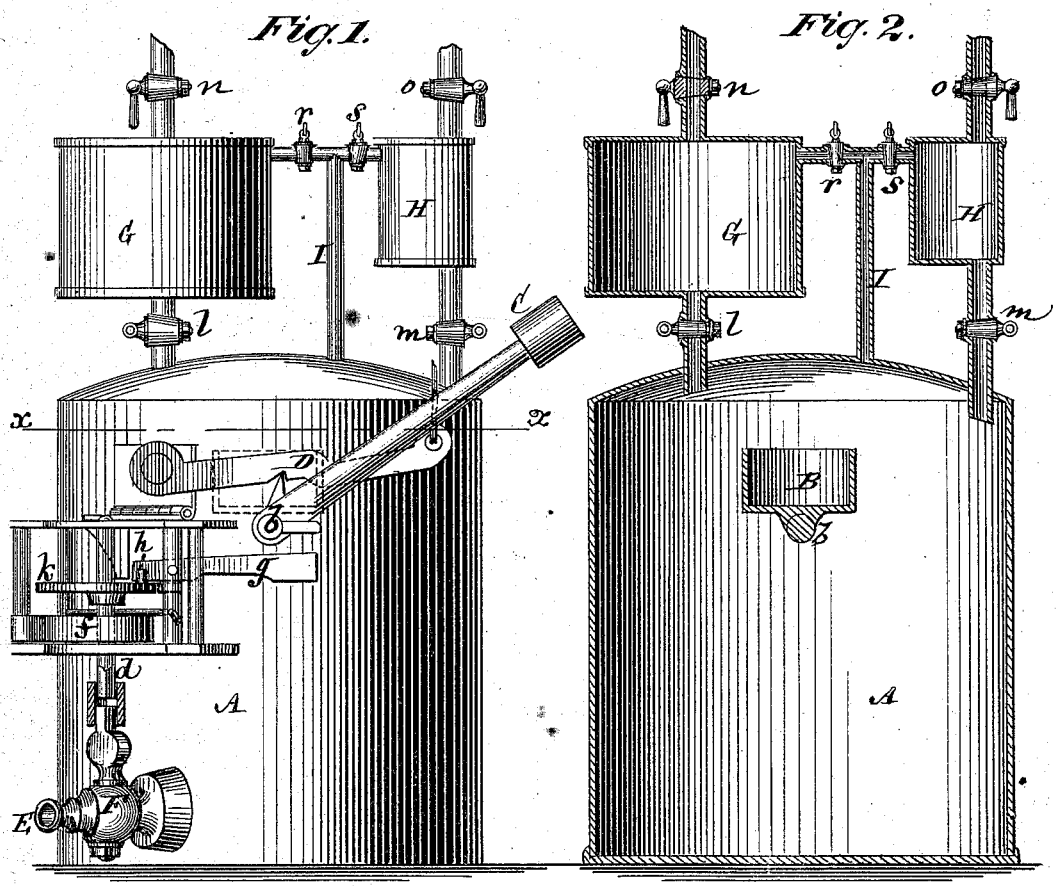
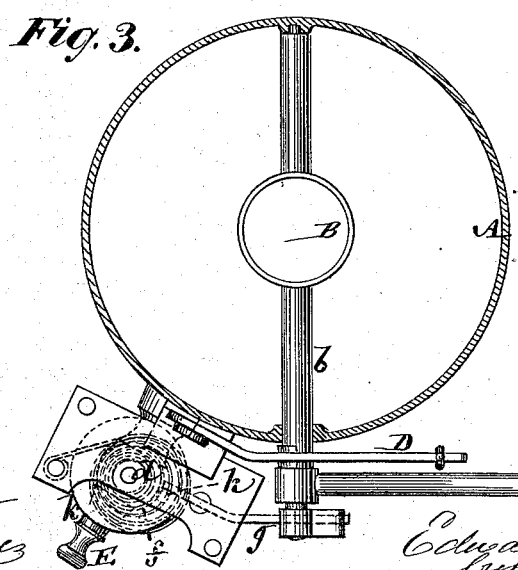
Witnesses
John Becker
Fred. Haynes
Edward F. Wadhams
by his Attorneys
Brown & Allen

UNITED STATES PATENT OFFICE.

EDWARD F. WADHAMS, OF STAMFORD, CONNECTICUT, ASSIGNOR OF NINE-TENTHS HIS RIGHT TO ELON FOSTER, OF NEW YORK CITY.

IMPROVEMENT IN FIRE-EXTINGUISHERS.

Specification forming part of Letters Patent No. 162,721, dated April 27, 1875; application filed February 18, 1875.

*To all whom it may concern:*

Be it known that I, EDWARD F. WADHAMS, of Stamford, in the county of Fairfield and State of Connecticut, have invented certain new and useful Improvements in Fire-Extinguishers; and I do hereby declare that the following is a full, clear, and exact description of the same, reference being had to the accompanying drawing, which forms part of this specification, and in which—

Figure 1 is an outside elevation of a fire-extinguishing apparatus constructed in accordance with my invention; Fig. 2, a vertical section of the same, and Fig. 3 a horizontal section thereof on the line $x\ x$.

This invention relates to apparatus for extinguishing fires by gas generated by the mixture of an acid with an alkali or alkaline solution, as, for instance, by the mixture of sulphuric acid with bicarbonate of soda, and in which the one of said ingredients, preferably the acid, is contained in a vessel which is tripped or otherwise made to discharge its contents into the alkaline solution when it is required to produce the gas for extinguishing a fire.

The invention is applicable to both portable and stationary apparatus of the description above referred to, and for use either in buildings, on shipboard, or other places.

This invention consists in a combination of a tripping mechanism, for discharging the contents of the one vessel into those of the other, with a cock or valve, for permitting the discharge or escape of the gas as it is generated, whereby the one operation serves to mix the gas-generating ingredients, and to liberate the gas for extinguishing a fire; thus, besides saving time, labor, and making the apparatus more expeditiously manageable, protecting the apparatus against confinement of the gas within it, and thereby adding to safety in the use of the apparatus. This automatic opening of the cock to allow of the discharge of the gas simultaneously with its generation will be found of great advantage, especially in small fires and on a sudden emergency.

A in the drawing is the gas-generating chamber or vessel, containing the alkaline solution; and B, the bucket or pan containing the acid, said bucket or pan being pivoted or supported on a rocking shaft, $b$, to admit of the pan being tripped or upset when it is required to generate gas. Said pan is tripped by means of a weighted lever, C, attached to the shaft $b$ on the outside of the apparatus—that is, the pan is tripped when said lever is released for the purpose. The lever C is supported in its raised position, and the pan B kept from being prematurely tripped, by a catch-lever, D, which may be operated from any one of a series of rooms, or from any desired point, by a wire connected with it. E is the outlet for the gas, controlled by a cock, F, and made automatic as regards the opening of it, when or immediately after the pan B is tripped by mechanism interposed between the weighted lever C and the cock. Thus connected with the cock is an arbor, $d$, which is controlled by a spring, $f$, that, in relaxing, opens the cock. This spring, when wound or at its operating tension, which is when the cock F is closed, is kept from relaxing by a lever, $g$, adjusted to come in front of a stop, $h$, on a lever or disk, $k$, attached to the arbor $d$.

Upon the weighted lever C being released, it first trips the pan B, and then, by an arm or projection on the shaft $b$ of said lever, strikes or releases the lever $g$ and sets the stop $h$ at liberty, so that the arbor $d$ is free to turn under the influence of the spring $f$, and the cock F is opened to let out the gas. In this way or by these means the cock for liberating the gas to extinguish the fire is opened rapidly and automatically at the same time or immediately after the acid-pan is tripped, thus making the one operation of the lever serve the two purposes of tripping the pan and letting out the gas, and thereby insuring a prompt action for the extinguisher, and obviating the liability to rupture the vessel A by prolonged or excessive pressure within it, and thereby allowing the vessel A to be made both lighter and of cheaper construction, and dispensing with the necessity of a safety-valve.

When it becomes desirable to provide for keeping up the supply of gas, so as to maintain a continuous stream, I replenish, as needed, the gas-making materials to the vessel A by means substantially as follows: Thus, mounted on the vessel A, for communication with the latter, are an alkali-reservoir, G, and an acid-reservoir, H, fitted with discharge-cocks $l$ $m$ and inlet or supply cocks $n$ $o$, also connected at their tops with said vessel A by an equilibrium-pipe, I, having cocks $r$ $s$.

By means of these several connections and cocks controlling the same the reservoirs G H may be separately charged from time to time with fresh ingredients, and their communication with the vessel A be shut off, or be opened when it is required to resupply the vessel A either with alkali or acid; and, by opening either cock $r$ or $s$, according to which reservoir it is necessary to discharge from into the vessel A, an equilibrium of pressure is kept up between such reservoir and the vessel A, thus insuring a free discharge by gravity of the contents of the reservoir.

I claim—

The combination, with the pan B, vessel A, and discharge-cock F, of tripping mechanism, interposed between the pan and the cock, for opening the latter when discharging the contents of the pan, substantially as specified.

EDWARD F. WADHAMS.

Witnesses:
BENJAMIN W. HOFFMAN,
MICHAEL RYAN.